US006795865B1

(12) United States Patent
Bahl et al.

(10) Patent No.: US 6,795,865 B1
(45) Date of Patent: Sep. 21, 2004

(54) ADAPTIVELY CHANGING WEIGHTS FOR FAIR SCHEDULING IN BROADCAST ENVIRONMENTS

(75) Inventors: Paramvir Bahl, Issaquah, WA (US); Nitin Vaidya, Blue Bell, PA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/415,895

(22) Filed: Oct. 8, 1999

(51) Int. Cl.$^7$ .............................................. G06F 15/16
(52) U.S. Cl. ...................... 709/235; 709/200; 709/201; 709/239; 709/240; 709/241; 709/243; 370/229; 370/232; 370/412; 370/431; 370/452; 370/464; 370/468; 370/469; 375/240
(58) Field of Search ................................ 709/239, 240, 709/241, 201, 243, 235; 370/229, 431, 464

(56) References Cited

U.S. PATENT DOCUMENTS

| | | | | |
|---|---|---|---|---|
| 5,315,586 A | * | 5/1994 | Charvillat | |
| 5,434,848 A | * | 7/1995 | Chimento, Jr. et al. | |
| 5,854,899 A | * | 12/1998 | Callon et al. | |
| 6,028,841 A | * | 2/2000 | Lyon et al. | |
| 6,078,953 A | * | 6/2000 | Vaid et al. | |
| 6,091,455 A | * | 7/2000 | Yang | |
| 6,188,698 B1 | * | 2/2001 | Galand et al. | |
| 6,198,728 B1 | * | 3/2001 | Hulyalkar et al. | 370/310.1 |
| 6,240,463 B1 | * | 5/2001 | Benmohamed et al. | |
| 6,314,110 B1 | * | 11/2001 | Chin et al. | |
| 6,341,309 B1 | * | 1/2002 | Vaid et al. | |
| 6,408,005 B1 | * | 6/2002 | Fan et al. | |
| 6,470,016 B1 | * | 10/2002 | Kalkunte et al. | 370/395.41 |

FOREIGN PATENT DOCUMENTS

| | | | |
|---|---|---|---|
| EP | 0829986 A | 3/1998 | |

OTHER PUBLICATIONS

Hui Huang et al, Hierarchical scheduling with adaptive weights for W–ATM, IEEE ATM Workshop '99 Proceedings, May 24–27, 1999, pp. 337–342.

J.L. Sobrinho, A.S. Krishnakumar, Quality of Service in Ad Hoc Carrier Sense MA Networks, IEEE Journal on Selected Areas in Comms, vol. 17, pp 1353–1368, Aug. 1999.

IEEE, Wireless LAN MAC and PHY Specifications, IEEE Standard 802.11, 1999 Edition.

S. Floyd, V. Jacobson, Random Early Detection Gateways for Congestion Avoidance, IEEE/ACM Transactions on Networking, vol. 1, No. 4, 397–413, Aug. 1, 1993.

D. Lin, R. Morris, Dynamics of Random Early Detection, Procs. of SIGCOMM '97, pp. 127–137, Sep. 1, 1997.

T.S. Ng, I. Stoica, H. Zhang, Packet Fair Queueing Algorithms for Wireless Networks with Location–Dependent Errors, INFOCOM, Mar. 1, 1998.

S. Lu, T. Nandagopal, V. Bharghavan, A Wireless Fair Service Algorithm for Packet Cellular Networks, ACM MobiCom, Jan. 1, 1998.

(List continued on next page.)

Primary Examiner—Hosain Alam
Assistant Examiner—Young N Won
(74) Attorney, Agent, or Firm—Leydig, Voit & Mayer, Ltd.

(57) ABSTRACT

Adaptively changing weights for fair scheduling in broadcast environments. In one embodiment, a computer-implemented method allocates bandwidth among a plurality of flows, such as nodes, sharing an output link, such as a network. The method includes adaptively determining a weight for each flow, based on a predetermined criterion, and allocating a portion of bandwidth to each flow proportionally to the weight for the flow. In one embodiment, the predetermined criterion takes into account an input rate of data packets for each flow, while in another embodiment, the predetermined criterion takes into account a queue size for each flow.

16 Claims, 5 Drawing Sheets

OTHER PUBLICATIONS

S. Lu, T. Nandagopal, V. Bharghavan, Design and Analysis of an Algorithm for Fair Service in Error–Prone Wireless Channels, Wireless Networks, Feb. 1, 1999.

V. Bharghavan, S. Lu, T. Nandagopal, Fair Queuing in Wireless Networks: Issues and Approaches, IEEE Personal Communications Magazine, Feb. 1, 1999.

G. Nandagopal, S. Lu, V. Bharghavan, A Unified Architecture for the Design and Evaluation of Wireless Fair Queueing Algorithms, ACM MobiCom, Aug. 1, 1999.

S. Lu, V. Bharghavan, R. Srikant, Fair Scheduling in Wireless Packet Networks, ACM SIGCOMM, Jan. 1, 1997.

P. Goyal, H.M. Vin, H. Cheng, Start–time Fair Queuing: A Scheduling Algorithm for Integrated Services Packet Switching Networks, IEEE/ACM Transactions on Network, vol. 5, pp. 690–704, Oct. 1, 1997.

P. Ramanathan, P. Agrawal, Adapting Packet Fair Queueing Algorithms to Wireless Networks, ACM MobiCom, Jan. 1, 1998.

J.L. Sobrinho, A.S. Krishnakumar, Real–time traffic over the IEEE 802.11 MAC layer, Bell Labs Technical Journal, pp. 172–187, Oct. 1, 1996.

* cited by examiner

ADAPTIVELY CHANGING WEIGHTS FOR FAIR SCHEDULING IN BROADCAST ENVIRONMENTS

FIELD OF THE INVENTION

This invention relates generally to broadcast environments such as wired and wireless networks, multi-hop networks, etc., and more particularly to adaptively changing weights for fair scheduling for data transmission within such environments.

BACKGROUND OF THE INVENTION

Broadcast environments include environments in which information is transmitted from discrete originating points over a common medium, and include environments such as networking environments, which have become increasingly common. Networking means that two or more computers or computerized devices, referred to generically as nodes, are communicatively coupled together, so that they can exchange data, typically in the form of packets of data. Networking includes wired local-area-networks (LAN's), in which nodes are connected physically over relatively short distances, wireless LAN's, in which nodes communicate wirelessly over relatively short distances, and multi-hop networks, in which nodes communicate with other nodes on the network, using intermediate nodes to forward their messages.

The amount of data that a network can handle at a given moment in time is referred to as bandwidth. For example, the commonly known Ethernet network generally comes in two different speeds: 100 megabits-per-second (mbps) and 10 megabits-per-second (mbps). This means that, per second, the network is able to accommodate either 100 megabits or 10 megabits of data.

An issue in broadcast environments, such as the ones described above, is determining which node gets to communicate at a given time. Algorithms and schemes to determine which node gets to communicate at a given time typically also concern themselves with fairness. Fairness can be defined in different ways. For example, fairness can mean that each node on the network has a predetermined percentage of the available bandwidth on the network over a given duration of time, a predetermined priority relative to the other nodes on the network, or a weight to divide the available network bandwidth relative to the other nodes. In addition, fairness can mean that a predefined Quality of Service (QOS) is guaranteed for one or more given nodes on the network. A non-restrictive example of QOS is that a given node is guaranteed to receive x amount of bandwidth within y amount of time after the node requests to transmit data over the network.

Within the prior art, fairness has generally been implemented by randomizing the time at which different nodes compete for the broadcast channel to transmit their data. The theory is that by randomizing the time, the nodes on the network will pick generally different times to transmit and consequently each will get a chance to transmit its data. While such randomization techniques improve the probability that, over a long period of time, every node gets an opportunity to use the channel, they generally result in poor performance when nodes have to transmit time-constrained data, such as voice and video.

One manner by which fairness can be achieved and which solves this problem is described in the cofiled, copending and coassigned patent application entitled "Fair Scheduling in Broadcast Environments" [U.S. patent application Ser. No. 09/415,901]. In this application, each node within a network is able to transmit a packet of data after it has counted down from a back-off interval. The back-off interval for each packet is based on at least a start tag of the packet, which is assigned to the packet when it arrives at or within the node for transmission. The tagging of packets with their start tags and using these tags to schedule transmission provides for fair scheduling, such that each node eventually has its turn to transmit information.

In fair scheduling described in the application identified in the previous paragraph, as well as in the prior art, a fixed weight is usually implicitly or explicitly assigned to each node that does not vary over time. A node's weight is usually based on its priority or bandwidth requirements. The weight for a node thus determines the amount of bandwidth that a node requires and is proportional to the amount of bandwidth it is allocated by the network. For example, where the weights for all the nodes are equal, no node has priority, and each node can be allocated the same amount of bandwidth. As another example, if all the nodes except one have a given weight, and the one node has twice the weight of any other node, then the node with the greater weight will have twice the opportunity to transmit packets of data as any other node, and thus will be able to have allocated to it twice the amount of bandwidth as compared to any other node.

Fixed weights, however, assume that the priority of the nodes and/or their bandwidth requirements are unchanging during a connection's lifetime, and can be determined a priori. This may not be the case. For example, at any given time, one or more of the nodes may be transmitting more time-sensitive data, such as voice data, such that during that transmission such nodes should be accorded higher weight. Another example is when a large quantity of data arrives at a node in a short period of time and this node would want to transmit this data quickly by picking a higher weight dynamically. Fixed-weight schemes do not provide for these situations. For these and other reasons, there is a need for the present invention.

SUMMARY OF THE INVENTION

The invention relates to adaptively changing weights for fair scheduling in broadcast environments. In one embodiment, a computer-implemented method allocates bandwidth among a plurality of flows sharing an output link. Each flow can correspond to a node within a network, for example, or an application program generating data packets within a node. The output link can correspond to the network itself, for example, or the node itself, respectively. The method includes adaptively determining a weight for each flow, based on a predetermined criterion, and allocating a portion of bandwidth to each flow proportionally to the weight for the flow.

For example, in one embodiment, the predetermined criterion takes into account an input rate of data packets for each flow. Thus, flows that are receiving more data packets for transmission over the link over a period of time are accorded higher weights. As another example, in one embodiment, the predetermined criterion takes into account the queue size for each flow. Thus, flows that have a greater backlog of data packets for transmission over the link are accorded higher weights. In either embodiment, the bandwidth accorded to each flow is proportional to the weight for the flow, and may also be based on a protocol or algorithm for fair scheduling that can utilize the weight, such as protocols and algorithms known within the prior art, and also that which is described in the copending, cofiled and coassigned application referenced in the previous section of the specification.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which are shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit and scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
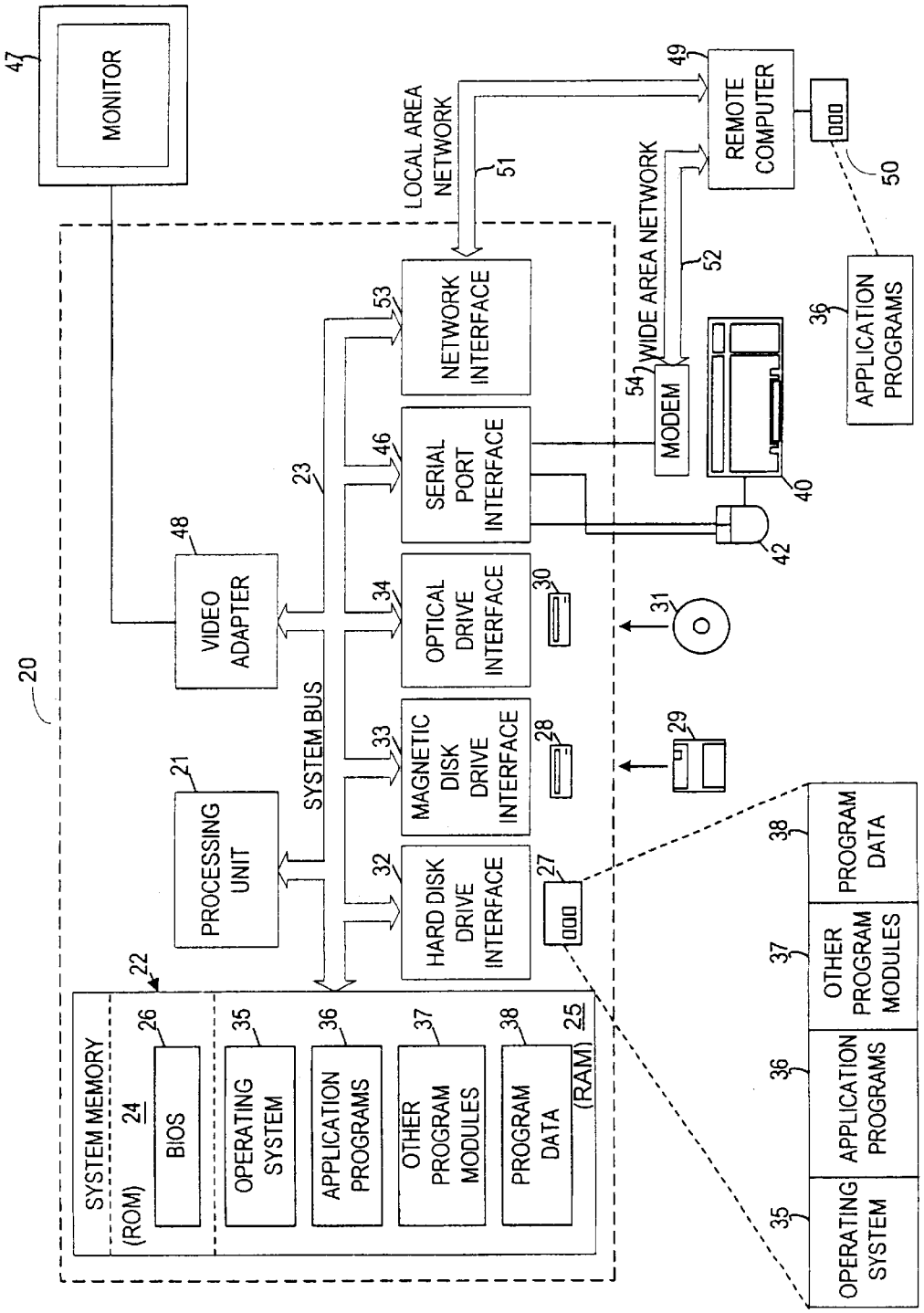
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Broadcast Environments

In this section of the detailed description, representative broadcast environments, in conjunction with which embodiments of the invention can be practiced, are described. However, those of ordinary skill within the art can appreciate that the invention is not limited to any particular broadcast environment or the set of broadcast environments described herein. Specifically, three example broadcast environments are described: a wired local-area network (LAN), a wireless LAN, and a wireless, multi-hop network.

Figure 2A:
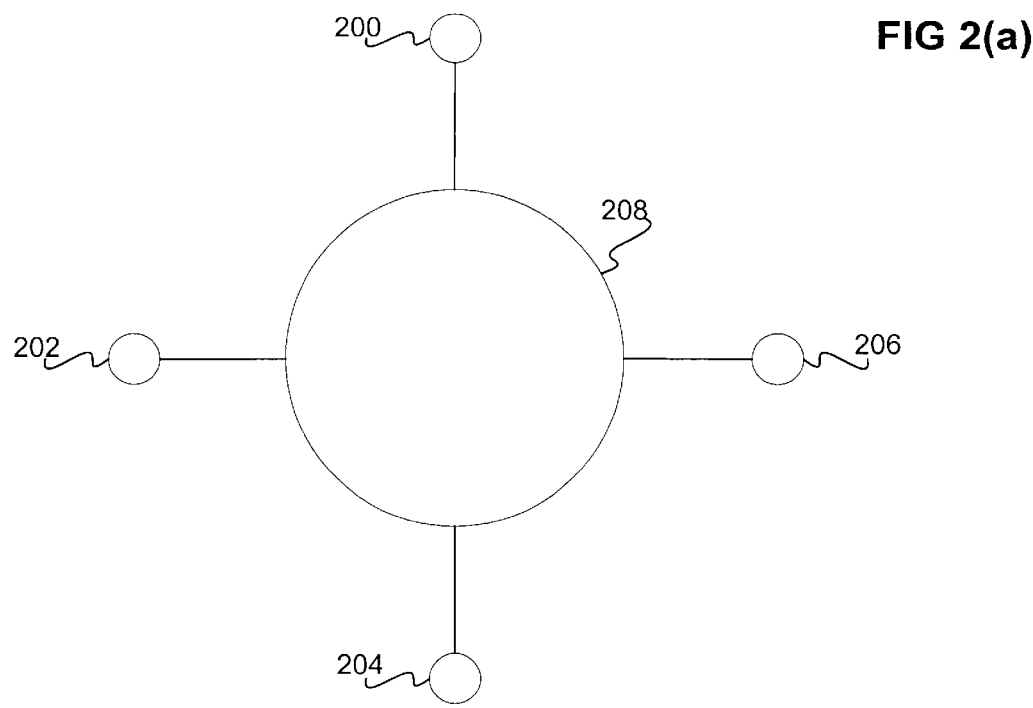
FIGS. 2(a)–2(c) are diagrams of example broadcast environments in conjunction with which embodiments of the invention can be practiced.

Referring first to FIG. 2(a), a diagram of a wired LAN is shown. The LAN 208 includes nodes 200, 202, 204 and 206. The nodes are connected to one another in a physical manner. For example, cables can connect the nodes to one another. The LAN 208 has the characteristic that any node is able to communicate with any other node in the network in a direct manner. Example nodes include computers, such as that described in the previous section of the detailed description, as well as computerized devices, such as cell phones, personal digital assistant (PDA) devices, etc.; the invention is not so limited.

Figure 2B:
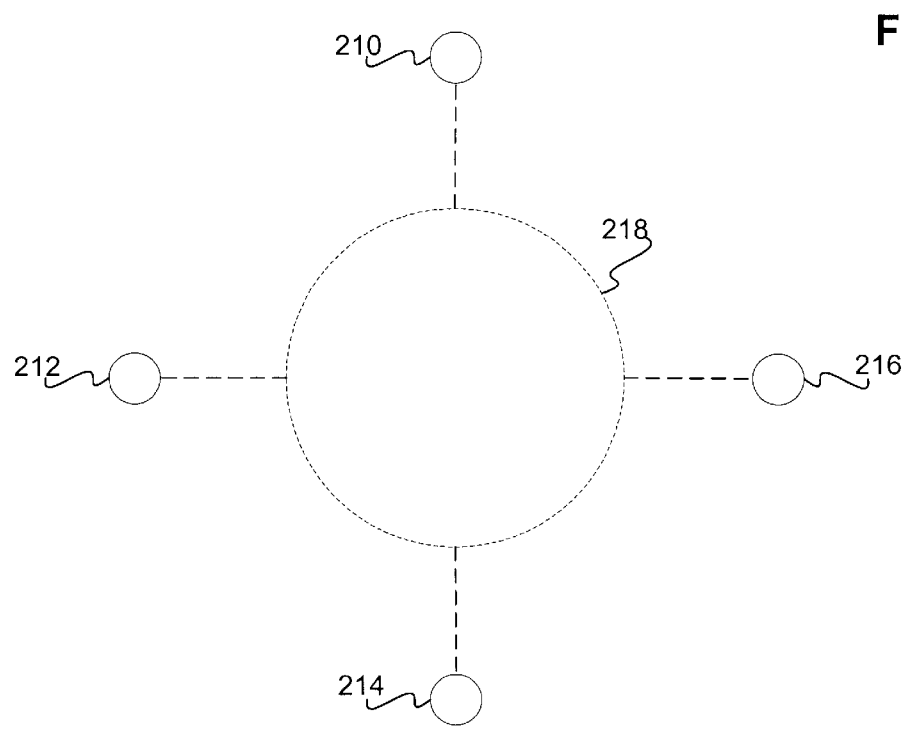

Referring next to FIG. 2(b), a diagram of a wireless LAN is shown. Similar to the LAN 208 of FIG. 2(a), the LAN 218 includes nodes 210, 212, 214 and 216. However, in the diagram of FIG. 2(b), the nodes communicate with one another in a wireless manner. For example, each node can include a transceiver such that the node is able to send information over a radio frequency (RF), such as the commonly used 2.4 GHz frequency, although the invention is not so limited. The LAN 218 also has the characteristic that any node is able to communicate with any other node in the network in a direct manner. Example nodes include computers, such as that described in the previous section of the detailed description, as well as computerized devices, such as cell phones, personal digital assistant (PDA) devices, etc.; the invention is not so limited.

Figure 2C:
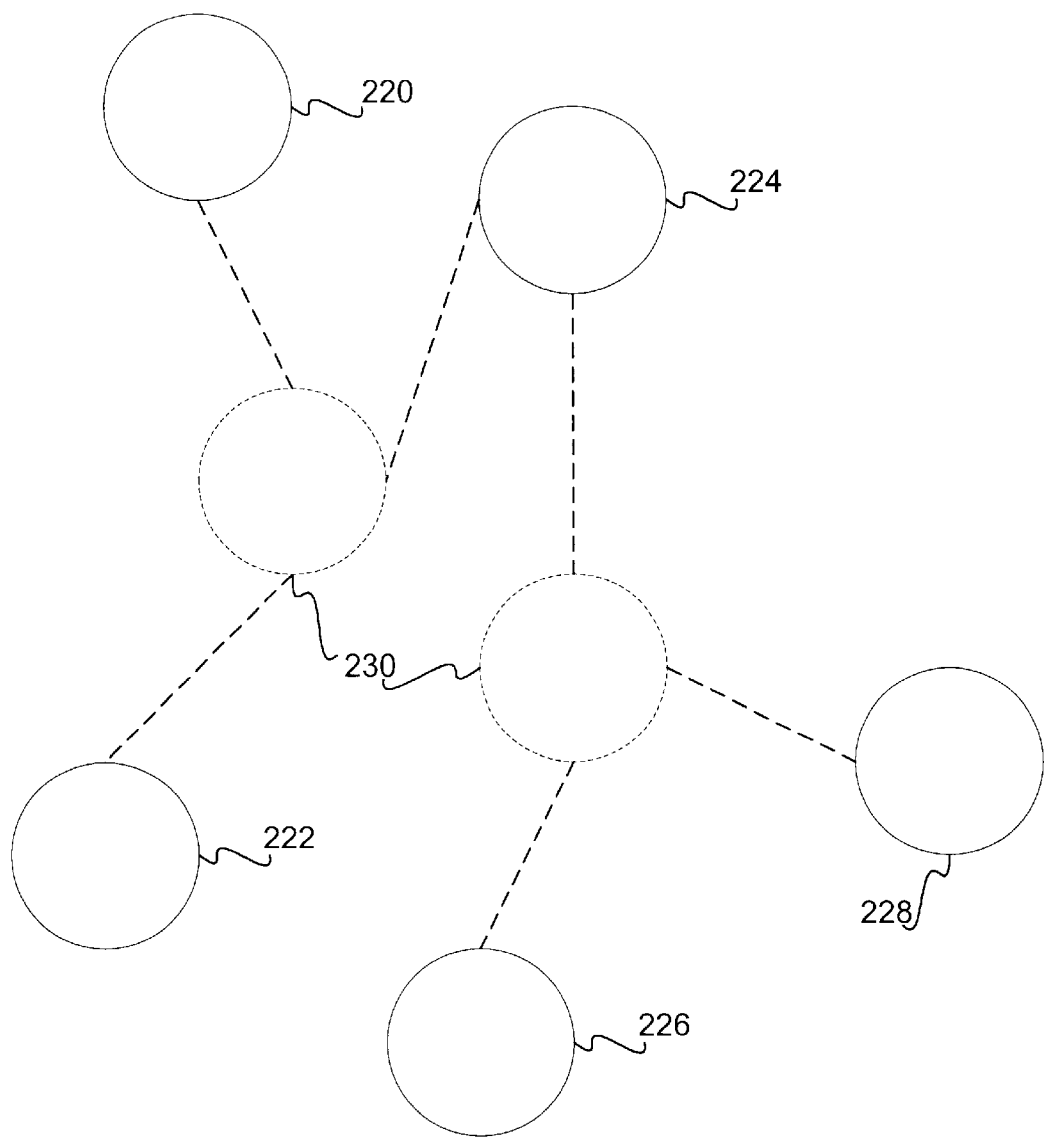

Referring next to FIG. 2(c), a diagram of a wireless multi-hop network is shown. The network 230 includes nodes 220, 222, 224, 226 and 228. The nodes communicate with one another in a wireless manner, such as that described in the previous paragraph in conjunction with the description of a wireless LAN. It is noted, however, in the network of FIG. 2(c), that not each node is able to communicate directly with every other node, which is the defining characteristic of a multi-hop network. For example, the node 222 is able to communicate directly with nodes 220 and 224, but not with nodes 226 and 228. Rather, communication between the node 222 and the nodes 226 and 228 must "hop" through node 224. This may be because, for example in the case of wireless communication among the nodes, the node 222 has sufficient communicative range to reach nodes 220 and 224, but not nodes 226 and 228. Example nodes, as before, include computers, such as that described in the previous section of the detailed description, as well as computerized devices, such as cell phones, personal digital assistant (PDA) devices, etc.; the invention is not so limited.

Figure 3:
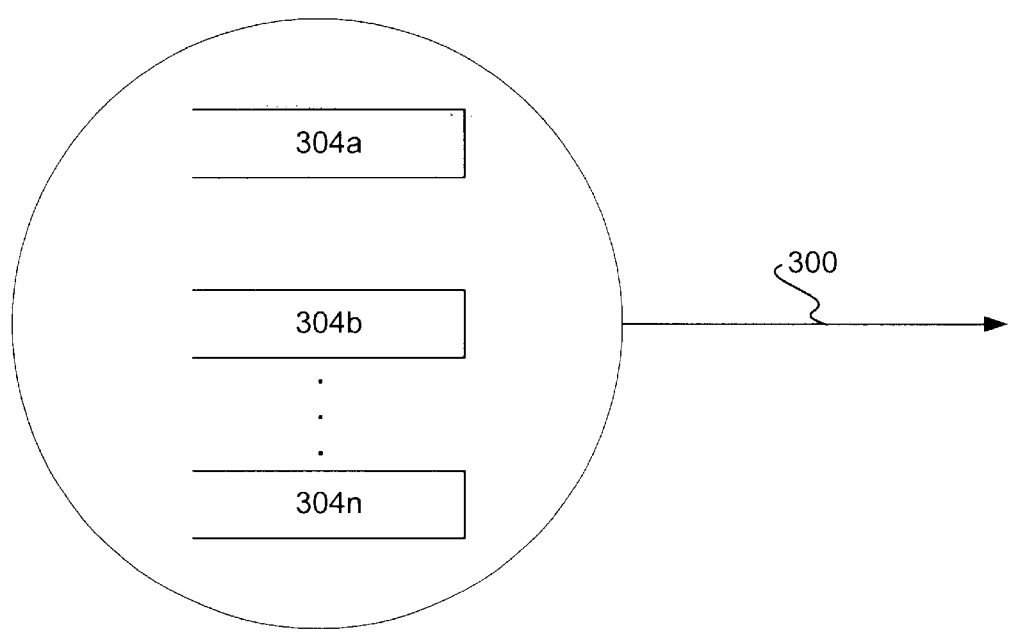
FIG. 3 is a diagram of an abstraction of a broadcast environment, according to an embodiment of the invention; and, FIG. 4 is a flowchart of a method according to an embodiment of the invention.

Referring finally to FIG. 3, a diagram of an abstraction of a broadcast environment, such as the broadcast environment of FIG. 2(a), or FIG. 2(b), is shown. In the example, there are flows 304a, 304b, . . . , 304n, which correspond to the nodes of FIG. 2(a), or 2(b). The link 300 corresponds to the network of FIG. 2(a), or 2(b). The abstraction of FIG. 3 is useful because it shows that when a node, that is, a flow, wishes to transmit a packet of data over a network, that is, a link, the link is commonly shared among all the nodes or flows.

Methods

In this section of the detailed description, methods according to varying embodiments of the invention are described. The methods are desirably computer-implemented and realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be part of a computer system of a computer, such as that described in conjunction with FIG. 1 in a previous section of the detailed description. The invention is not so limited, however.

Figure 4:
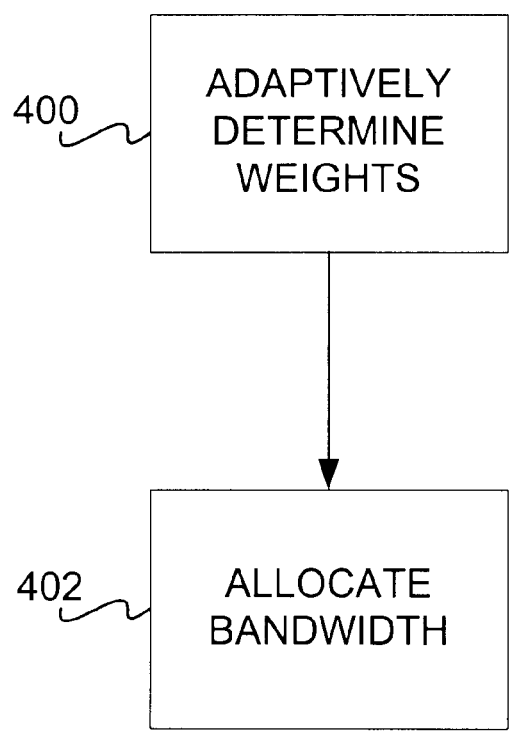

Referring now to FIG. 4, a flowchart of a method according to an embodiment of the invention is shown. The method is for allocating bandwidth among a plurality of flows sharing an output link, as these terms have been described in the previous sections of the detailed description and of the application. For example, each flow can correspond to a node, or a number of nodes, where in the latter instance each flow can correspond to a queue over the nodes. The output link can correspond to a network, such as a local-area network (LAN), a multi-hop network, or a wireless network. In 400, a weight for each flow is adaptively determined based on a predetermined criterion. The weights are adaptively determined in that they can vary over time, in a dynamic manner, and are not static or fixed a priori.

In one embodiment, the predetermined criterion is an input rate of data packets at each flow. For example, the input rate may be an input rate at which packets are arriving at or within a flow for transmission over the output link. Where each flow corresponds to a node, the packets may be generated by a different application program at the node. Where a flow corresponds to a number of nodes, the packets may be generated by different nodes.

In this embodiment, adaptively determining a weight for each flow in 400 includes determining the input rate for each flow, and adaptively determining the weight for each flow as the input rate multiplied by a normalizing constant. For instance, in one embodiment, the input rate at a given time $\tau$ is $$r(\tau) = \frac{tr(t) + \xi L}{\tau},$$

where, $\xi$ is a rate-sensitivity constant, r(t) is the input rate at a previous time t, and L is the packet size. The rate-sensitivity constant determines sensitivity of the rate estimate to short-term changes in the arrival pattern. Given the input rate, the weight is $$w(\tau) = \frac{r(\tau)}{\text{Normalizing factor}},$$

where Normalizing factor is a constant. For instance, in the case of a 2 Mbps (mega-bits per second) network, the maximum achievable throughput can be about 1.3 Mbps, where the packet size L is 512 bytes. Thus, a normalizing factor of 1.3 Mbps can be used. With such a normalizing factor, the weight approximately represents the arrival rate as a fraction or multiple of maximum achievable throughput.

In another embodiment, the predetermined criterion is the queue size of each flow. For example, the queue size can correspond to the number of packets within a queue at a flow awaiting transmission by the queue for transmission over the output link. In this embodiment, adaptively determining a weight for each flow in 400 includes estimating the number of packets in the queue of each flow, and adaptively determining the weight for each flow as the number of packets in the queue divided by a maximum number of packets allowed in the flow.

The invention is not limited to a particular approach to determining the current queue size for a flow, and such approaches are known within the art. In one embodiment, a low-pass filter approach is used, as described in the reference S. Floyd, V. Jacobson, "Random Early Detection Gateways for Congestion Avoidance," IEEE/ACM Transactions on Networking, vol. 1, no. 4, pp. 397–413 (August 1993). In another embodiment, a modified low-pass filter approach is used, as described in the reference, D. Lin, R. Morris, "Dynamics of Random Early Detection," Proceedings of SIGCOMM '97, pp. 127–137 (September 1997).

Thus, still describing the embodiment of the invention where the queue size for each flow is the predetermined criterion for adaptively changing the weights for the flows, the weight can be determined as $$w(\tau) = \frac{\text{Avg queue size}(\tau)}{\text{Max allowed queue size}}.$$

Avg queue size($\tau$) is the number of packets pending in the queue at time $\tau$. Max allowed queue size specifies the maximum allowed size of the queue for the flow.

In 402, a portion of the bandwidth of the output link is allocated to each flow, proportional to the weight for each flow. 402 can be used in conjunction with protocols and algorithms used to implement fair scheduling in broadcast environments, in which such weights are typically static or fixed a priori implicitly or explicitly. For example, the weights determined in 400 can be used to allocate bandwidth to each flow in 402 in conjunction with that described in the copending, cofiled and coassigned application entitled "Fair Scheduling in Broadcast Environments" [U.S. patent application Ser. No. 09/415,901]. However, the invention is not so limited. In some such protocols and algorithms, where weights are not mentioned at all, a constant weight equal for all flows is implicitly assigned; in other such protocols and algorithms, weights may be mentioned, but may be unequal over the flows.

As can be appreciated by those of ordinary skill within the art, embodiments of the invention can apply not only to methods and computer-implemented methods. For example, a computerized system including an output link with bandwidth and a number of flows is amenable to an embodiment of the invention. In such an instance, each flow shares the bandwidth of the output link as proportional to a corresponding adaptive weight based on a predetermined criterion, as has been described, for example. The output link can be a local-area network (LAN), a wireless network, or a multi-hop network, that communicatively couples the flows, for example. The system may include one or more nodes where, for example, one flow may correspond or otherwise be located at each node.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method for allocating bandwidth among a plurality of flows sharing an output link comprising:

adaptively determining a weight for each flow based on a predetermined criterion comprising an input rate for each flow, where the input rate at a given time is derived as $$r(\tau) = \frac{tr(t) + \xi L}{\tau},$$

where $\xi$ is a rate-sensitivity constant, and r(t) is the input rate a previous time t, and L is packet size; and allocating a portion of bandwidth to each flow based on the weight for the flow.

2. The method of claim 1 wherein the adaptively determining the weight for each flow comprises adaptively determining the weight as the input rate multiplied by a normalizing constant.

3. The method of claim 1 wherein the output link comprises a local area network.

4. The method of claim 1 wherein the output link comprises a wireless network.

5. A computer-implemented method for allocating bandwidth among a plurality of flows sharing an output link comprising:

adaptively determining a weight for each flow based on a predetermined criterion, wherein adaptively determining a weight for each flow comprises determining the weight as $$w(\tau) = \frac{r(\tau)}{\text{Normalizing factor}},$$

where $$r(\tau) = \frac{tr(t) + \xi L}{\tau},$$

$\xi$ is a rate-sensitivity constant, and r(t) is the input rate a previous time t, L is packet size, and Normalizing Factor is a constant; and allocating a portion of bandwidth to each flow based on the weight for the flow.

6. The method of claim 5 wherein the adaptively determining the weight for each flow based on the predetermined criterion comprises adaptively determining the weight for each flow based on the input rate and a queue size.

7. The method of claim 5 wherein the output link comprises a local area network.

8. The method of claim 5 wherein the output link comprises a wireless network.

9. A machine-readable medium having instructions stored thereon for execution by a processor to perform a method for allocating bandwidth among a plurality of flows sharing an output link comprising:

adaptively determining a weight for each flow based on determining an input rate for each flow, wherein determining the input rate for the flow comprises determining the input rate at a given time as $$r(\tau) = \frac{tr(t) + \xi L}{\tau},$$

where $\xi$ is a rate-sensitivity constant, and r(t) is the input rate a previous time t, and L is packet size; and allocating a portion of bandwidth to each flow based on the weight for the flow.

10. The medium of claim 9 wherein the adaptively determining the weight for each flow comprises adaptively determining the weight as the input rate multiplied by a normalizing constant.

11. The medium of claim 9 wherein the output link comprises a local area network.

12. The medium of claim 9 wherein the output link comprises a wireless network.

13. A machine-readable medium having instructions stored thereon for execution by a processor to perform a method for allocating bandwidth among a plurality of flows sharing an output link comprising:

adaptively determining a weight for each flow based on an input rate for each flow wherein adaptively determining a weight for each flow comprises determining the weight as $$w(\tau) = \frac{r(\tau)}{\text{Normalizing factor}},$$

where $$r(\tau) = \frac{tr(t) + \xi L}{\tau},$$

$\xi$ is a rate-sensitivity constant, and r(t) is the input rate a previous time t, L is packet size, and Normalizing Factor is a constant; and allocating a portion of bandwidth to each flow based on the weight for the flow.

14. The medium of claim 13 wherein the adaptively determining the weight for each flow based on the predetermined criterion comprises adaptively determining the weight for each flow based on the input rate and a queue size.

15. The medium of claim 13 wherein the output link comprises a local area network.

16. The medium of claim 13 wherein the output link comprises a wireless network.

* * * * *